Figure 1:
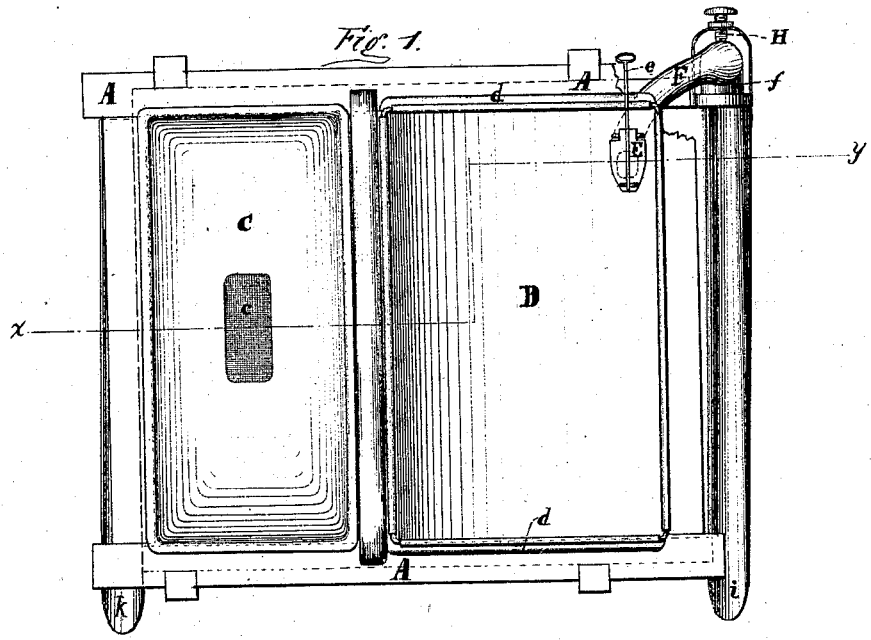

J. R. McKay,
Milk Cooler.
No. 113,438. Patented Apr. 4, 1871.

Witnesses
V. C. Clayton
G. Mathys.

Inventor:
John R. McKay
by his attys
Jo. C. Clayton & Co.

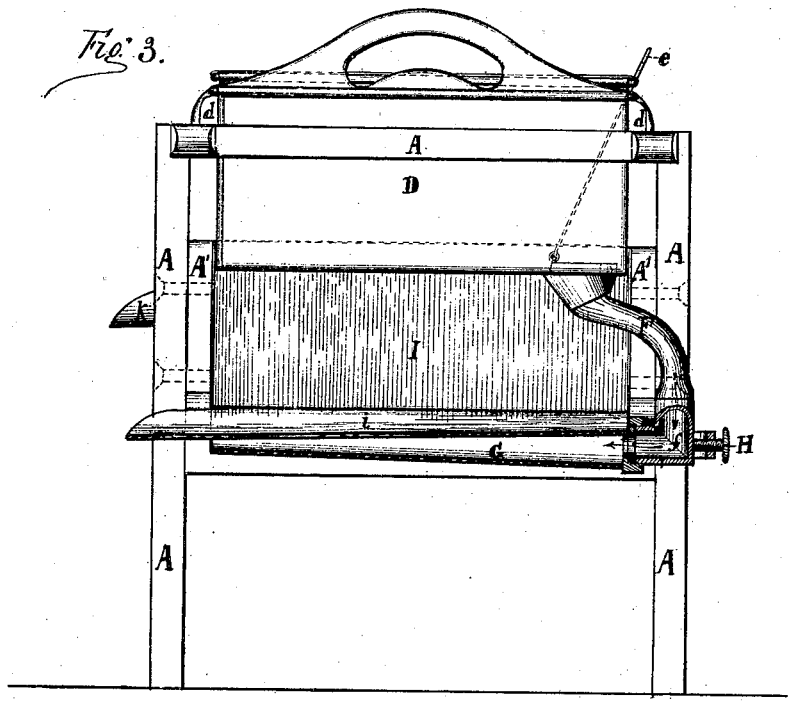
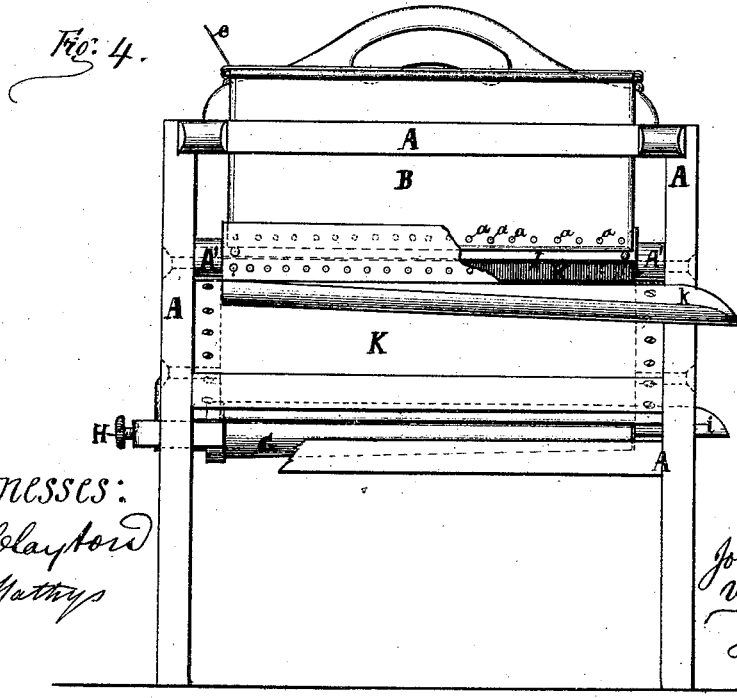

United States Patent Office.

JOHN R. McKAY, OF ROCKTON, ILLINOIS.

Letters Patent No. 113,438, dated April 4, 1871.

IMPROVEMENT IN APPARATUS FOR COOLING MILK.

The Schedule referred to in these Letters Patent and making part of the same.

*To all whom it may concern:*

Be it known that I, JOHN R. McKAY, of Rockton, in the county of Winnebago and in the State of Illinois, have invented certain new and useful Improvements in Milk-Coolers; and I do hereby declare that the following is a full, clear, and exact description thereof, reference being had to the accompanying drawing and to the letters of reference marked thereon.

The nature of my invention consists in the construction of a double pan, with one pan above the other, the upper pan being open at its top, while the lower pan is closed as a chamber. Each pan is inclined and parallel to the other, so that in operation the milk will flow down the upper pan from the milk-vat at the same time that the water is forced in a continuous flow up through the lower inclosed pan or chamber from the water-vat, and so cool the milk. Also, in the manner and by the means more fully hereinafter described for discharging the milk and water from the vats to the double pan, and for discharging the milk and water from the apparatus.

To enable those skilled in the art to make and use my invention I will now proceed to describe its construction and operation.

In the drawing—

Figure 1, Sheet I, is a plan view of my invention, and

Figure 2:
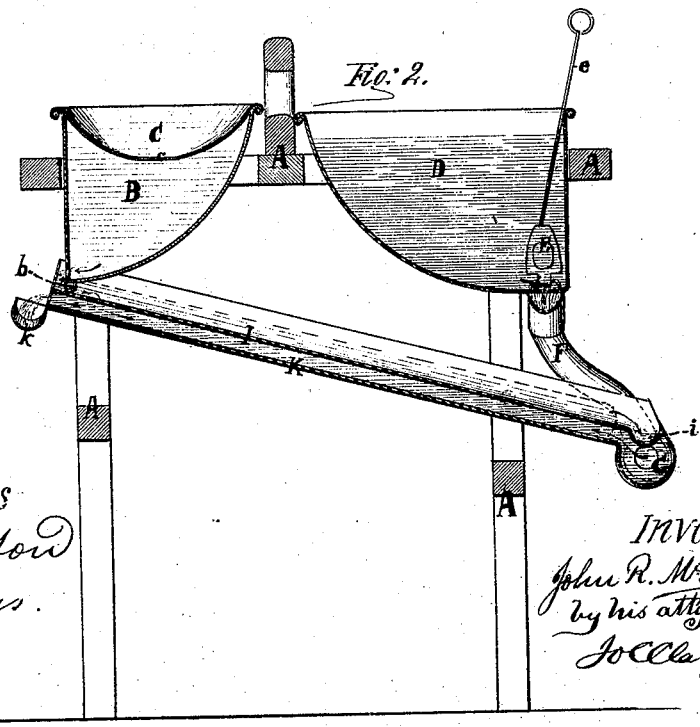

Figure 2 is a longitudinal side sectional view through the line $x$–$y$ in fig. 1.

Figures 3 and 4, Sheet II, are front and rear end views, respectively.

A is the frame-work to support the several parts of the apparatus.

B is the milk-vat, constructed of suitable materials, of the shape indicated in the drawing, and of a size adapted to the wants of the user.

This vat B is set in the frame-work, and by it held erect, as shown in fig. 2, with the nobs $b$, fig. 2, serving as legs and resting upon the bottom of the pan on which the milk is cooled.

The lower edge of the side of vat B, facing to the rear of the apparatus, is perforated with a series of small holes, marked $a$, fig. 4, through which the milk escapes to the cooling-pan.

A concave cover, C, is provided for the vat B, and in the center of the cover C is a strainer, $c$, by means of which the milk is strained while pouring it into the milk-vat.

D, the water-vat or tank, is constructed of suitable materials, and its shape is similar to the shape of the milk-vat, of the same depth, but wider, as shown in Sheet I, fig. 2.

This vat D is set into the frame-work A, as shown in fig. 2, and is supported by the cleats $d\ d$, secured to each end of the vat, which rest upon the framework, as shown in figs. 1 and 3.

The opening in the bottom of this tank D is closed or opened by valve E, operated by the rod $e$.

Below the opening in tank D is the mouth of pipe F, fitted and secured in a proper manner to the under side of the water-tank, as shown in fig. 3.

The lower end of pipe F is a metallic elbow, $f$, as shown in fig. 3, suitably attached to the body of the pipe, which may be constructed of rubber, canvas, or other flexible material adapted to the purpose.

The metallic elbow $f$ has its disengaged end fitted into a seat in the end of tube G, (see figs. 2 and 3,) and a water-tight joint is made by means of packing $g$, fig. 3.

By means of the set-screw H the elbow $f$ is made to fit snugly up in its seat, as shown in figs. 1 and 3; or by unscrewing screw H the pipe F may be taken out to be cleaned or to clean tube or trough G.

The double-pan, by means of which the milk is cooled, is shown in section in fig. 2, where the upper pan is I and the lower pan K.

These pans are metallic, and united together so that the lower pan K shall be inclosed so as to form a chamber, with one end opening into the tube G and the other or upper end perforated with holes to allow the water to run off in the gutter $k$.

Pan I has formed as the continuation of its lower end a gutter, $i$, by means of which the milk, as it is cooled, may be discharged into the vessels placed to receive the milk.

The double pan is thus seen to be a combination of the pans I and K, the gutters $i$ and $k$, and the tube G, and is secured on each side to braces A' of the frame, (see fig. 3,) which are set at the incline it is desirable to have the double pan inclined.

Having constructed the apparatus as above described, to operate it the water-vat D is filled with water, and by pulling up the rod $e$ the valve E is opened, as shown in fig. 2. The water in vat or tank D then descends through the pipe F into the tube G, through pan or chamber K, which is filled full to the top by the water.

The water thus flowing on the under side of the pan I makes it thoroughly cool, and then passes out at the openings in the upper end of pan K into the gutter $k$, from whence it is discharged.

At the moment of opening the valve E, as above described, the milk is poured into the cover C, and, passing through strainer $c$, is freed from impurities, and passes down into the vat B, which will be filled; and the milk will pass from the vat B through the holes $a$, fig. 4, into the pan I, and flow down the pan over the cool bottom of the pan which the water flowing in the reverse direction to the milk has cooled, into the gutter $i$, from whence it is discharged into the vessels intended to receive it clean and cool.

A constant stream of water is supplied by the water-tank as long as the valve E is kept open; but when all the milk has been cooled the supply of water may be cut off by closing the valve; and by setting the valve open at various heights the flow of water may be regulated.

It will be seen that the water flows up the chamber or pan K by pressure, and so filling the entire space in said chamber with running water, and carrying an unbroken flow of cool water up against the whole extent of the pan I, on which the milk descends.

If desirable, the water can be cooled in the water-vat by adding ice to the water.

Having thus fully described my invention,

What I claim as new, and desire to secure by Letters Patent, is—

1. The double pan or cooler, constructed of pans I and K, the tube G, and gutters $i$ and $k$, substantially in the manner and for the purposes set forth.

2. The tank D, placed in relation to the cooler or double pan so that the head of water shall be higher than the point of discharge of water from the water-pan K, for causing a constant pressure or contact of the water in its upward flow against the bottom of the milk-pan I.

3. The milk-vat B, with cover C and strainer $c$, in combination with the double pan or cooler, when constructed and operating substantially in the manner and for the purposes set forth.

4. The water-vat or tank D, with valve E, in combination with pipe F and the double pan or cooler, when constructed and operating substantially in the manner and for the purposes set forth.

In testimony that I claim the above-described certain new and useful improvements in milk-coolers I have hereunto signed my name this    day of 1870.

JOHN R. McKAY.

Witnesses:
 CALEB BENTLEY,
 JOHN GIBSON.